United States Patent

Seung-Lyul

Patent Number: 5,446,614
Date of Patent: Aug. 29, 1995

[54] PINCH ROLLER CLEANING APPARATUS OF TAPE RECORDING/REPRODUCTION DEVICE

[75] Inventor: Choi Seung-Lyul, Kyonggi-do, Rep. of Korea

[73] Assignee: Samsung Electronics Co., Ltd., Kyonggi-Do, Rep. of Korea

[21] Appl. No.: 953,227

[22] Filed: Sep. 30, 1992

[30] Foreign Application Priority Data

Oct. 29, 1991 [KR] Rep. of Korea ................ 91-18141

[51] Int. Cl.⁶ .................... G11B 5/10; G11B 5/127
[52] U.S. Cl. ................................ 360/137; 360/128
[58] Field of Search ............... 360/128, 137; 15/DIG. 12, DIG. 13, 100, 256.52

[56] References Cited

U.S. PATENT DOCUMENTS

| | | | |
|---|---|---|---|
| 4,498,115 | 2/1985 | Hoffman | 360/132 |
| 4,580,185 | 4/1986 | Clausen et al. | 360/128 |
| 4,855,856 | 8/1989 | Matsuoka | 360/128 |
| 4,941,065 | 7/1990 | Fritsch | 360/128 |
| 5,021,912 | 6/1991 | Shao-Yung | 360/128 |
| 5,170,304 | 12/1992 | Katohno et al. | 360/128 |

FOREIGN PATENT DOCUMENTS

| | | | |
|---|---|---|---|
| 54-103335 | 8/1979 | Japan | 360/137 |
| 61-192017 | 8/1986 | Japan | 360/128 |
| 2101309 | 8/1990 | Japan | |
| 35212 | 1/1991 | Japan | |
| 4186512 | 7/1992 | Japan | 360/128 |

*Primary Examiner*—Robert S. Tupper
*Assistant Examiner*—David D. Davis
*Attorney, Agent, or Firm*—Sughrue, Mion, Zinn, Macpeak & Seas

[57] ABSTRACT

A pinch roller apparatus for a recording/reproduction device which prevents the contamination of a head, resulting from foreign objects settled on the recording medium, by providing a cleaning roller for removing foreign objects from a pinch roller. The invention allows cleaning of a pinch roller without utilizing a separate dedicated cassette for cleaning.

4 Claims, 4 Drawing Sheets

PINCH ROLLER CLEANING APPARATUS OF TAPE RECORDING/REPRODUCTION DEVICE

BACKGROUND OF THE INVENTION

1. Field of the Invention

The present invention relates to a tape recorder for recording and reproducing signals (image, sound, character, and the like) on a recording medium such as magnetic tape. More particularly, the invention relates to a pinch roller apparatus for a tape recording/reproduction device, which can prevent the deterioration of picture quality caused by the adhesion of foreign objects to the recording medium, by providing a cleaning device for eliminating foreign objects adhered to the circumferential surface of the pinch roller which helps to feed the recording medium.

2. Description of the Related Art

In a conventional tape driving apparatus, illustrated in FIG. 1, a tape 200 extracted from the supply reel 20 of a cassette 100, which is positioned in opposition to head drum 10, is guided by a tension shaft and tension poles 30a, 30b of a supply guide device and guide roller 30c and slant guide 30d. The tape 200 is then caused to slide along the circumferential surface of a recording-/reproduction blanking head 40 at a predetermined slant angle. The tape 200 is then guided by a plurality of guide means such as a slant guide 40a, a guide roller 40b, a tape guide 40c and a review arm 40d and is caused to wind around the take-up reel 60 after passing along an audio control head 50. A capstan 70 and a pinch roller 80 are provided in opposition to one another so as to impart a feeding force to the tape 200 at a position between the audio control head 50 and the take-up reel 60.

In the conventional tape driving apparatus described above, the tape 200 is held against the head drum 10 by guide means while the cassette 100 is positioned by a cassette loading apparatus (not shown).

In other words, the tape 200 is guided from the supply reel 20 of cassette 100, by a plurality of supply guide means 30a, 30b, 30c, 30d, and then contacts the circumferential surface of head drum 10 after passing a blanking head 40 at a predetermined slant angle. The tape 200 is then caused to be wound around the take-up reel 60 of the cassette by guide means 40a, 40b, 40c, 40d after passing the audio control head 50.

As illustrated in FIGS. 1 and 2, the pinch roller 80 is provided at a position between the audio control head 50 and the take-up reel 60 for pressing the tape 200 against the circumferential surface of the capstan 70. The pinch roller 80 is supported at the free end of a pivotable lever 90. The capstan 70 is caused to rotate by a capstan motor so as to impart a feed force to the tape 200.

However, in such a conventional tape driving apparatus, foreign objects which have settled on the tape tend to stick to the pinch roller during a recording or playback operation. Similarly, the foreign objects adhered to the pinch roller during recording tend to stick to the tape again when the tape is fed in reverse, such as during a rewind operation, for example. As a result, the head may be damaged and undesirable noise may be generated during a playback operation.

Japanese laid open utility model Application No. Hei 2 (1990) 101309 discloses a technique for cleaning the head of a tape recorder by pressing a cleaning member against a rotating drum operation. Also, Japanese laid open utility model Application No. Hei 3-5212 discloses a technique in which a member for cleaning a magnetic head is mounted on a pole base.

However, because neither of the above-referenced applications disclose a technique for cleaning the pinch roller, it is inevitable that noise will be generated due to contamination of the head by foreign objects which have previously adhered to the pinch roller.

U.S. Pat. Nos. 4,580,185 and 4,498,115 disclose various techniques for preventing the above-mentioned problems.

In particular, the first of the above-mentioned U.S. patents discloses a capstan which is cleaned by a dedicated cleaning cassette. The pinch roller is placed in contact with a pad of the cassette, and the ribbon of the cassette is placed in contact with the head drum and audio head. Accordingly, the capstan, pinch roller, head drum and the audio head are cleaned when the cleaning cassette is inserted into the cassette loading apparatus.

In the second of the above-mentioned U.S. patents, the housing of a dedicated cleaning cassette has a felt pad attached thereto. The felt pad is placed in contact with the capstan so as to clean the capstan.

However, these references both require the use of separate cassettes for cleaning and are thus inconvenient.

SUMMARY OF THE INVENTION

It is an object of the present invention to provide a pinch roller apparatus for a tape recording/reproduction device which can ultimately prevent the generation of noise by removing foreign objects which tend to adhere to the pinch roller without the need for using a separate cassette dedicated for cleaning.

In order to obtain these objects, the pinch roller of the tape recorder in accordance with the present invention has a capstan which is rotated by a capstan motor, a pinch roller supported by a lever, which presses the tape against a circumferential surface of the capstan and a cleaning device for removing foreign objects from the pinch roller mounted on the lever.

BRIEF DESCRIPTION OF THE DRAWINGS

A preferred embodiment of the invention will be described in connection with the accompanying drawings in which:

FIGS. 3A and 3B are block diagrams of the pinch roller apparatus of a tape recording/reproduction device in accordance with a preferred embodiment of the present invention, wherein FIG. 3A is a front view and FIG. 3B is a top plan view.

DETAILED DESCRIPTION OF THE PREFERRED EMBODIMENT

Figure 1:
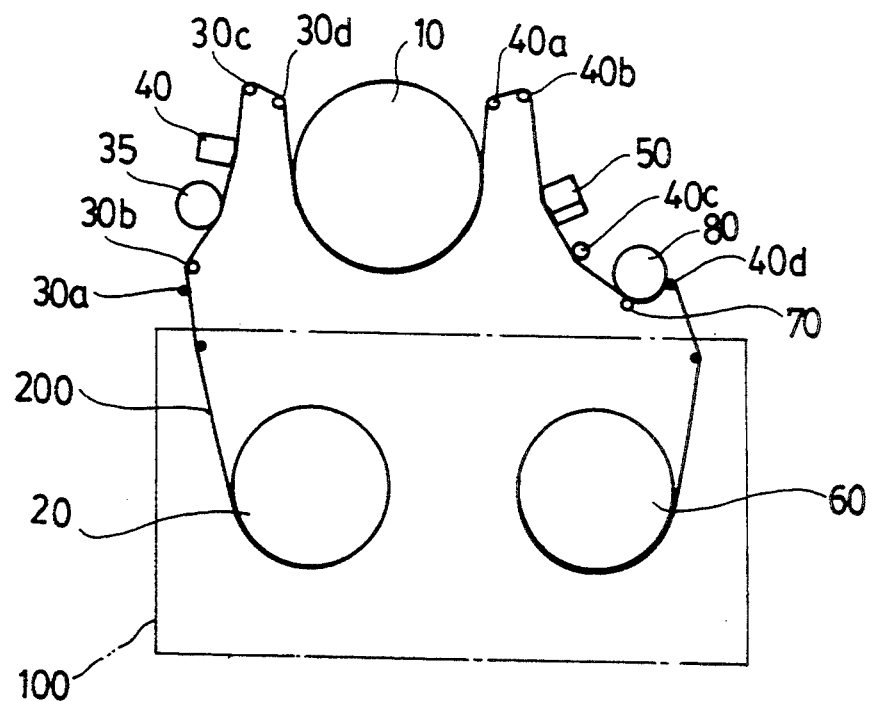
FIG. 1 is a top plan view illustrating schematically the driving apparatus of a conventional tape recorder.
Figure 2:
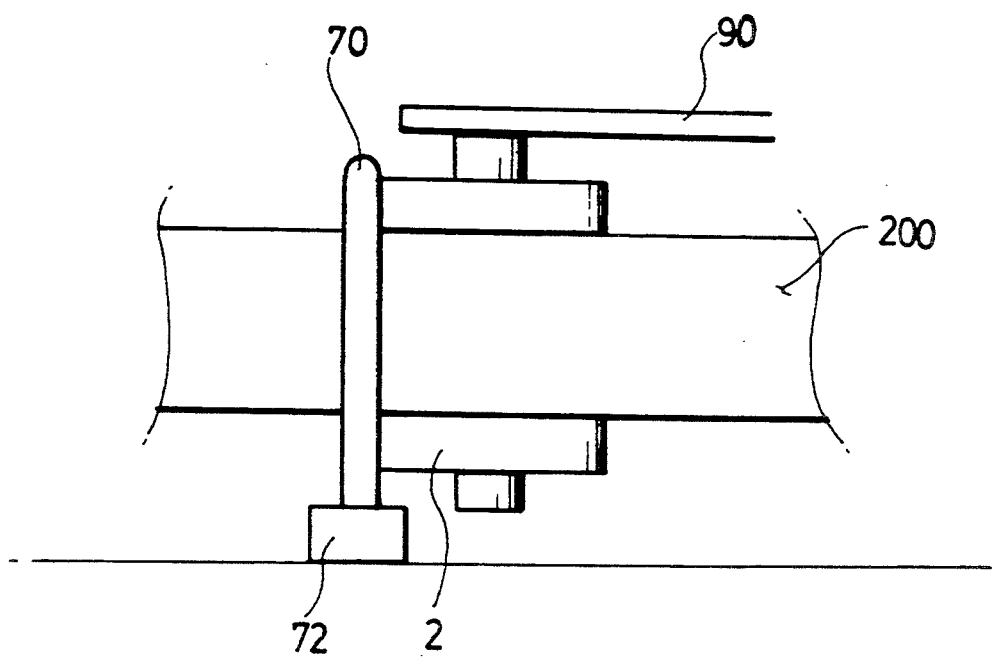
FIG. 2 is a front view for illustrating schematically the pinch roller apparatus of the conventional tape recorder.
Figure 3A:
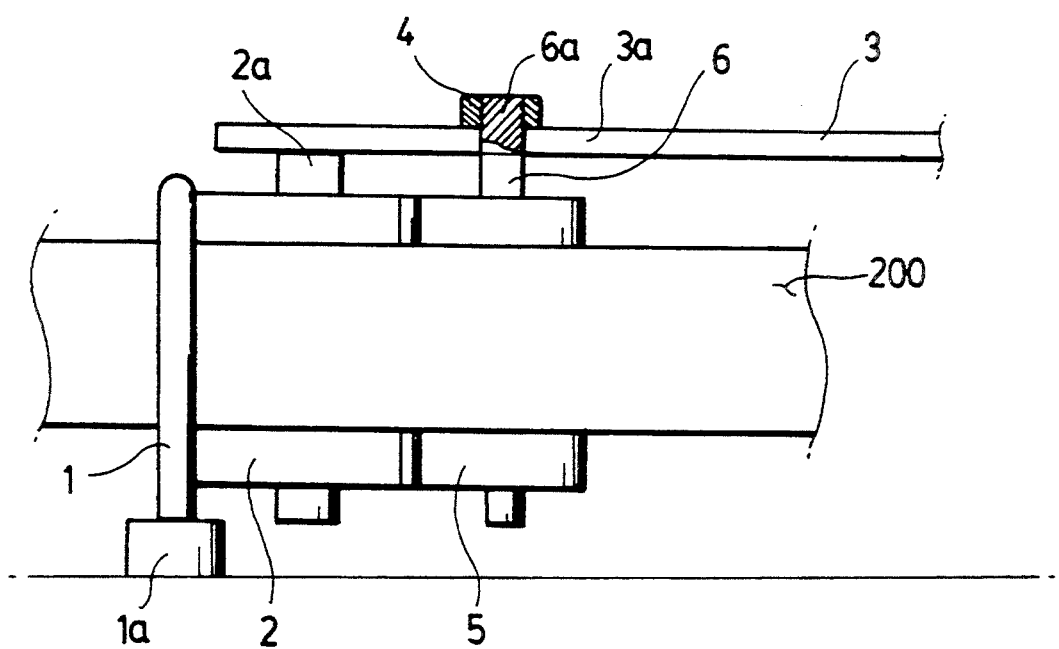
Figure 3B:
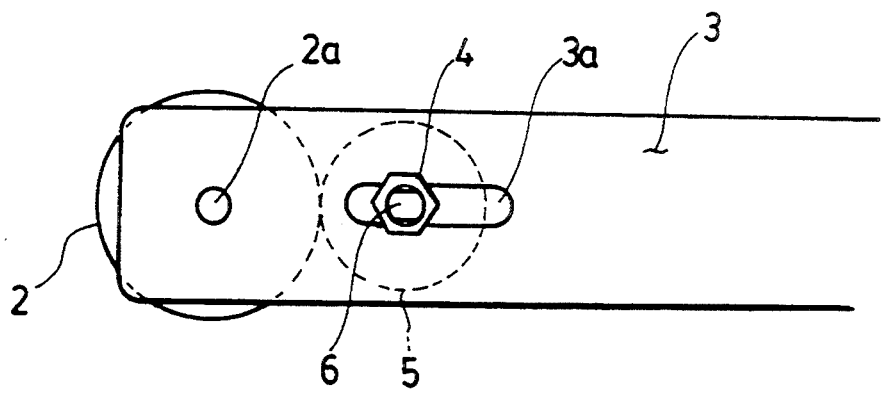

FIGS. 3A and 3B illustrate the pinch roller apparatus in accordance with a preferred embodiment of the present invention. A capstan 1 is rotated by the capstan motor 1a, a pinch roller 2 is disposed on the free end of a pivotable lever 3. The lever 3 can be pivoted so as to place the pinch roller 2 in direct opposition to the capstan 1 so as to press the tape 200 against the capstan 1. A cleaning device is also provided for cleaning foreign objects which have adhered to the pinch roller 2. The cleaning device includes an axle 6, which is fastened by a nut 4 after being inserted into a hole 3a formed in the lever 3, and a cleaning roller 5 rotatably mounted on the axle 6 so as to remove foreign objects from the pinch roller 2 while the cleaning roller 5 is placed in rotating contact with pinch roller 2.

In operation, the capstan 1 is rotated by the capstan motor 1a. The pinch roller 2, after being transferred by the lever 3, presses the tape 200 against the circumferential surface of the capstan 1. Accordingly, the tape 200 is fed by the rotation of capstan 1. The cleaning roller 5 is installed on the lever 3 in rotating contact with the pinch roller 2 and thus cleans foreign objects from the pinch roller 2. The remaining components of the preferred embodiment may be similar to the conventional device described above.

Axle 2a of pinch roller 2 is mounted to the lever 3 through a bearing (not illustrated) so as to allow the pinch roller to rotate along with the capstan 1.

Furthermore, the hole 3a having formed in the lever 3 is elongated into a rectangular shape. The axle 6, fastened in the hole 3a, is thus movable once the nut is loosened, thereby allowing the contact pressure between the cleaning roller 5 and the pinch roller 2 to be adjustable (see FIG. 3B).

Figure 4:
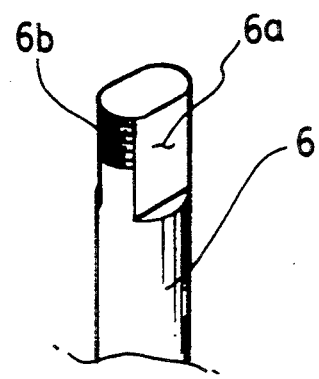
FIG. 4 is a perspective view illustrating, in detail, a part of a cleaner roller axle 5a as shown in FIGS. 3A and 3B.

A top portion of the axle 6 which is inserted into the hole 3a, has flat faces 6a formed thereon for preventing (see FIG. 4) rotation of the axle 6 after the axle 6 is inserted into the hole 3a (see FIG. 4). A bearing (not illustrated) is installed on the surface of contact between the cleaner roller 5 and the axle 6, allowing the cleaner roller 5 to rotate along with rotation of pinch roller 2.

FIG. 4 illustrates a top portion of the cleaner roller axle 5a. On the end of axle 6 where the flat faces 6a are formed, there is provided a screw thread 6b for allowing the nut 4 to be fastened to the axle 6 (see FIG. 3B). The flat faces 6a may be formed by cutting both sides of the axle 6 in order to make the width thereof slightly narrower than that of rectangular hole 3a, so that the axle 6 can be inserted into the rectangular hole 3a, as illustrated in FIG. 3.

Figure 5:
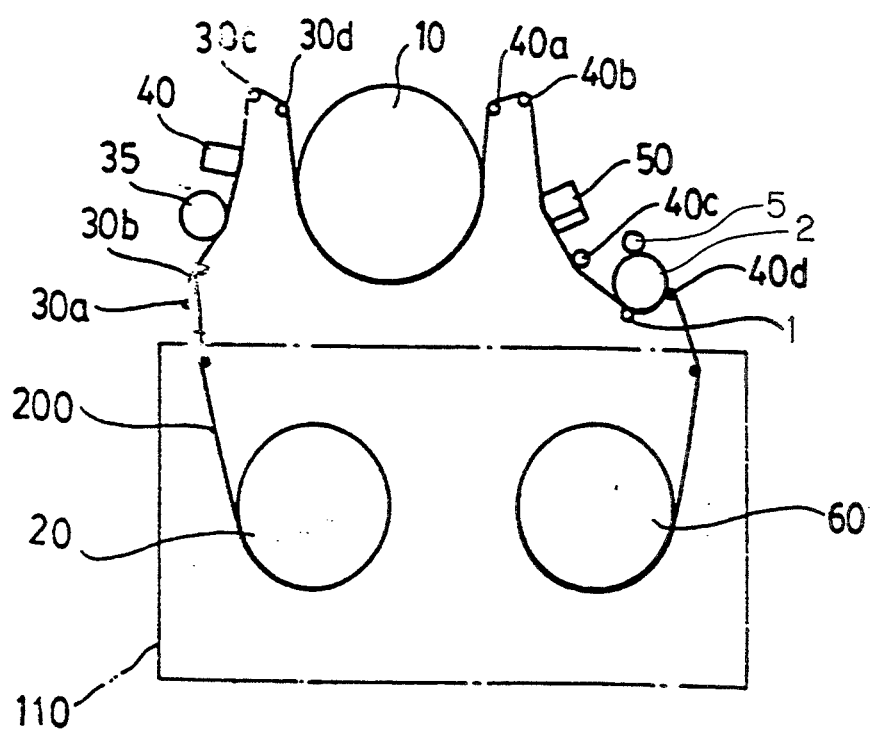
FIG. 5 is a top view of the preferred embodiment.

During operation, the tape contacts the head drum, the capstan 1 and the pinch roller 2 during a recording-/reproduction operation and the tape is wound around the take-up reel and supply reel in a manner similar to the conventional device. In other words, the tape is pulled out of a cassette, which is received in cassette area 110, and fed by capstan 1 and pinch roller 2 (see FIG. 5).

The foreign objects settled on the tape 200 would ordinarily stick to the pinch roller 2. However, the cleaner roller 5 rotatably contacts the circumferential surface of pinch roller 2 and removes the foreign objects adhered to the surface of pinch roller 2. Thereafter the foreign objects will not be returned to the tape 200 again.

Therefore, the head drum, which is in contact with the tape 200, is not contaminated by foreign objects and no noise, associated with such contamination is generated.

It is preferable that the material of the cleaner roller 5 is the same as that of pinch roller 2 or has a high absorption strength. Also, it is preferable that the cleaner roller be made of a highly elastic material.

If the pressure of mutual contact between the pinch roller 2 and cleaner roller 5 becomes reduced to an undesirably low level, the nut 4 can be loosened and the cleaner roller 5 can be moved towards the pinch roller 2 along the rectangular hole 3a of the lever 3, and then the nut 4 can be fastened again. Furthermore, if the degree of contamination of the cleaner roller 5 becomes too high, the nut 4 can be fully loosened so as to allow the cleaner rollers to be changed or replaced.

In this manner, the present invention, without using a separate dedicated cleaning cassette, can achieve the effect of enabling the user to view noise-free images by removing foreign objects adhered to the pinch roller from the tape by virtue of the cleaner rollers.

The foregoing description of the preferred embodiment has been presented for the purpose of illustration and description. It is not intended to limit the scope of this invention. In fact, many modifications and variations are possible in light of above teachings without departing from the scope of the invention as defined by the appended claims.

For example, in order to adjust the pressure between the cleaner roller and pinch roller, the axle of cleaner roller is moved in the rectangular hole, however the object of the present invention can also be achieved by maintaining the pressure through elastic force of the axle, or the like, after the axle of the cleaner roller is fixed to the lever.

Furthermore, in the preferred embodiment, the lever is mounted above the pinch roller, however, the lever may be mounted below the pinch roller.

What is claimed is:

1. A tape recording/reproduction device comprising:
   a receiving area defined in the device which is adapted to receiving a cassette housing the tape;
   a capstan;
   a capstan motor coupled to said capstan so as to impart rotation to said capstan;
   a lever pivotally attached to the recording/reproducing device;
   a pinch roller disposed in opposition to said capstan so as to press a recording medium, which passes between said pinch roller and said capstan, against said capstan;
   a cleaning device for removing foreign objects from said pinch roller, said cleaning device being disposed outside of said receiving area;
   said pinch roller and said cleaning device being disposed on said lever;
   said cleaning device comprises an axle which is inserted into a hole formed in said lever, a nut threadably engaged with an end portion of said axle so as to fix said axle to said lever, a cleaning roller rotatably disposed on said axle, said cleaning roller being in rotatable contact with said pinch roller so as to remove foreign objects from said pinch roller.

2. An apparatus as claimed in claim 1, said hole being formed in the shape of a rectangle having a predetermined length, said axle being movable along the length of said hole for adjusting a contacting force between said cleaning roller and said pinch roller.

3. A video cassette recorder comprising:
   a receiving area defined in the video cassette recorder which is adapted to receiving a video tape cassette;
   a capstan;

a capstan motor coupled to said capstan so as to impart rotation to said capstan;

a lever pivotally attached to the video cassette recorder;

a pinch roller disposed in opposition to said capstan so as to press a video tape, which passes between said pinch roller and said capstan, against said capstan;

a cleaning device for removing foreign objects from said pinch roller, said cleaning device being disposed outside of said receiving area;

said pinch roller and said cleaning device being disposed on said lever;

said cleaning device comprises an axle which is inserted into a hole formed in said lever, a nut threadably engaged with an end portion of said axle so as to fix said axle to said lever, a cleaning roller rotatably disposed on said axle, said cleaning roller being in rotatable contact with said pinch roller so as to remove foreign objects from said pinch roller.

4. A recording/reproduction device comprising:

a receiving area defined in the device which is adapted to receiving a cassette having a recording medium;

a capstan;

a capstan motor coupled to said capstan so as to impart rotation to said capstan;

a lever having a first end, which is pivotably mounted to said recording/reproduction device, and a second-end;

a pinch roller rotatably mounted to said second end;

a cleaning roller rotatably mounted to said lever, said cleaning roller being in rotatable contact with said pinch roller;

said lever being pivotable from a first position at which said pinch roller is spaced apart from said capstan, to a second position at which said pinch roller presses a recording medium against said capstan, said lever being disposed outside of said receiving area.

* * * * *